Sept. 25, 1934.    R. J. OLANDER    1,974,581
HAND BRAKE
Filed Dec. 9, 1932
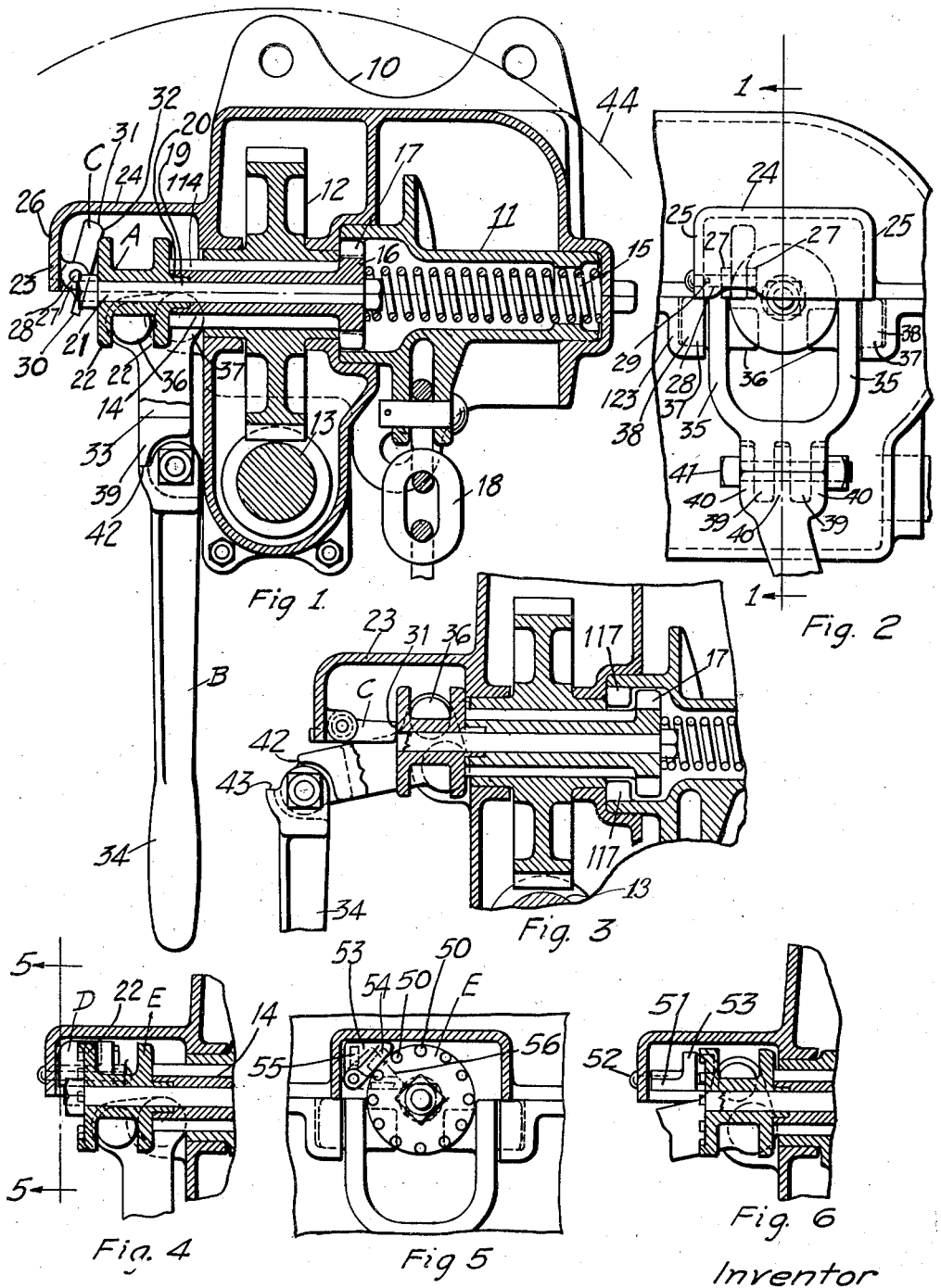
Inventor
Roland J. Olander
By Henry Fuchs, His Atty.

Patented Sept. 25, 1934

1,974,581

UNITED STATES PATENT OFFICE 1,974,581

HAND BRAKE

Roland J. Olander, Chicago, Ill., assignor to W. H. Miner, Inc., Chicago, Ill., a corporation of Delaware Application December 9, 1932, Serial No. 646,545

19 Claims. (Cl. 192—82)

This invention relates to improvements in hand brakes.

One object of the invention is to provide, in a hand brake mechanism of the type which includes a rotary hand-operated actuating means, a rotary chain winding element, and clutch means operatively connecting the actuating means and winding element, simple and efficient means, which is automatic in its operation, for preventing engagement of the clutch means unless the actuating means is rotated in the proper direction to wind the chain on the drum.

Another object of the invention is to provide, in a brake mechanism of the character specified in the preceding paragraph, means for latching the clutch means in disengaged position, wherein the latching means is rendered inoperative through rotation of the actuating means in a direction to tighten the brakes, thereby ensuring operative engagement of the clutch means each time the brakeman applies the brakes.

A more specific object of the invention is to provide a gravity controlled latching means of the character specified, which automatically drops to latching position with reference to the clutch means when the latter is moved to the disengaged position.

Other objects of the invention will more clearly appear from the description and claims hereinafter following.

In the drawing forming a part of this specification, Figure 1 is a vertical sectional view of a hand brake mechanism, illustrating my improvements in connection therewith, said sectional view corresponding to the line 1—1 of Figure 2. Figure 2 is an end elevational view, partly broken away, of the mechanism shown in Figure 1, looking toward the right in said last named figure. Figure 3 is a view similar to Figure 1, but showing the parts in a different position. Figure 4 is a sectional view similar to Figure 1, with parts broken away, illustrating another embodiment of the invention. Figure 5 is a vertical sectional view, corresponding substantially to the line 5—5 of Figure 4. And Figure 6 is a view similar to Figure 4, showing the parts in another position.

Referring first to the embodiment of the invention illustrated in Figures 1, 2, and 3, 10 indicates a housing which is designed to be secured to the vertical end wall of a railway car. The housing 10 contains a chain-winding drum 11, a worm gear 12, a worm 13 in driving engagement with the worm gear, a clutch shaft 14 slidingly mounted in the worm gear 12, and a spring 15 cooperating with the clutch shaft. The chain-winding drum 11 and the worm gear 12 are journaled in the housing for rotation about a common axis and the drum is hollow, as shown. The clutch shaft 14 has radially projecting, longitudinally disposed flanges 114—114 engaging in grooves of the worm gear 12 so that the shaft 14 is rotatable with said gear while being slidable therein. At the inner end, the shaft 14 is provided with a clutch head 16 having clutch projections 17—17 engageable between similar clutch projections 117—117 on the interior of the hollow drum. The section of the drum in which the clutch head is disposed is enlarged, as shown in Figure 1, to accommodate the clutch head 16 when moved to the right to disengage the projections 17—17 from the projections 117—117 of the drum. The spring 15, which is in the hollow portion of the drum, yieldingly holds the clutch head engaged. The usual winding chain 18 leads to the brake rigging proper of the car and is anchored to the drum in a well known manner.

In carrying out my invenstion, as illustrated in the embodiment shown in Figures 1, 2, and 3, I provide a spool A at the left-hand end of the clutch shaft 14 with which a clutch shifting lever B and a pivoted latch member C cooperate.

The spool A has an axial projection 19 at the inner end thereof, which is preferably of square cross section and fits within a square socket 20 at the outer end of the clutch shaft 14. The spool A is fixed to the shaft 14 by means of a locking bolt 21 extending through aligned openings in the shaft and spool and having a head at the outer end bearing on the outer end of the spool and a nut at the inner end bearing on the inner end of the shaft 14. The spool A is also provided with a pair of spaced annular flanges 22—22, which cooperate with the clutch shifting lever B as hereinafter pointed out.

The latch member C is in the form of a pivoted arm or finger housed within a chamber 23 forming a part of the left-hand end section of the housing 10, as viewed in Figures 1 and 3. The chamber 23 has a top wall 24, spaced side walls 25—25, and a vertical end wall 26, and is open at the bottom to accommodate the upper end of the lever B. The latch member C is swingingly supported between a pair of lugs 27—27 on the end wall 26 of the chamber 23 by means of a pivot pin 28 extending through said lugs 27—27 and the left-hand side wall 25 of the housing, as viewed in Figure 2. The pivot pin 28 is held against endwise movement by any suitable means, such as a cotter 29. The latch member C has the main body portion thereof disposed above the pivot pin 28, as shown in Figure 1, this portion being relatively thick and heavy so that the latch member will drop by the action of gravity. Below the pivot thereof, the latch member C has a tail-piece 30, which engages the bottom edge of the wall 26, as shown in Figure 3, to limit the downward swinging movement of said latch member.

As clearly shown in Figure 2, the latch member C is disposed to the left of the axis of rotation of the clutch shaft 14 so that the inner edge 31 of the latch member will engage the end face of the outer flange 22 of the spool A at a point to the left of the axis of rotation of said spool, as shown in Figure 2, and slightly above said axis, as shown in Figure 3. The shaft 14 is rotated in a clockwise direction, as viewed in Figure 2, when the brakes are being tightened. Due to the friction between the end 31 of the latch and the end face of the outer flange 22 of the spool A, the latch will swing upwardly from its locking position in Figures 2 and 3 when the shaft 14 is rotated in the direction to apply the brakes. When the latch member C has been lifted a short distance, the further upward swinging movement thereof is ensured by the movement of the clutch shaft 14 to the left, as viewed in Figures 1 and 3, the shaft 14 being urged to the left by the combined action of the spring 15 and the gravity-influenced lever B. Figure 3 shows the clutch completely disengaged from the projections 117—117 of the drum. When in this position, the clutch head 16 is spaced from the clutch projections 117—117 an appreciable distance, thereby providing a certain amount of sliding movement of the clutch under the influence of the spring 15 before the projections 17—17 of the clutch head encounter the projections 117—117 of the drum. Due to the fact that the spring 15 is under compression, this movement is quite sudden and will be delivered to the latch in the manner of a sharp blow, thereby quickly throwing the latch upwardly. When the latch is in the position shown in Figure 1, the upper end thereof rests on the periphery of the outer flange 22 of the spool A and the latch is held in that position until the clutch shaft 14 is manually moved inwardly to the disengaged position shown in Figure 3. In order to facilitate the upward swinging movement of the latch, the bottom corner 32 of the end 31 is preferably rounded off, as shown. As illustrated in the drawing, the end face of the outer flange 22 of the spool A is smooth but, as will be evident, it is within the scope of the invention to provide a roughened or knurled surface on either the flange or the end 31 of the latch C to increase the friction between these parts.

The operating lever B has an upper section or head 33 swingingly supported on the housing section 123 and a bottom section or hand grip portion 34 hinged to said head 33. The section 33 is in the form of a fork having arms 35—35 straddling the spool A. The arms have aligned trunnions 36—36 on the inner sides engaging between the flanges 22—22 of the spool A to effect sliding movement of the clutch shaft 14. The head 33 is pivotally supported on the housing by a pair of aligned trunnions 37—37 on the outer sides of the arms 35—35 rotatably mounted in bearing seats 38—38 on the inner sides of the walls 25—25 of the chamber 23 of the housing 10. The trunnions 37—37 are eccentric to the trunnions 36—36 so that swinging movement of the lever B will effect sliding movement of the clutch shaft 14. The hinged connection between the head 33 and the hand grip 34 is provided by interengaging hinge eyes 39—39 and 40—40—40 on said head and hand grip respectively and a hinge bolt 41 extending through said eyes. The hinge eyes 39—39 of the head 33 are provided with stop faces 42—42, which are engaged by shoulders 43—43 of the hinge section of the hand grip 34 so that the head 33 will swing with the hand grip 34 when the latter is swung outwardly and upwardly away from the housing and will also permit dropping of the hand grip to the pendent position shown in Figure 3. The hinged arrangement of the head and hand grip of the lever B permits dropping of the hand grip to a position where it is entirely out of the way and will not interfere with the movements of the brakeman.

In the operation of my improved hand brake mechanism, as shown in Figures 1, 2, and 3, assuming that the clutch head 16 of the shaft 14 is engaged with the clutch means of the winding drum 11, as shown in Figure 1, the chain is wound on the drum by rotation of the worm gear 12 and the shaft 14 in a clockwise direction, as viewed in Figure 2. The worm gear 12 is driven through the worm 13, which is actuated by the hand wheel of the brake mechanism shown in dotted lines and indicated by 44 in Figure 1. At this time, the clutch head is held yieldingly engaged by means of the spring 15 and the actuating lever B which is held in pendent position under the influence of gravity. During this rotation of the parts, the latch C is held in the raised position shown in Figure 1 by engagement with the outer flange 22 of the spool A.

When it is desired to release the brakes, the lever B is swung to the left and upwardly, as viewed in Figure 1, thereby sliding the clutch shaft 14 inwardly and disengaging the clutch head 16 from the drum, as shown in Figure 3. When the clutch has been thus disengaged, the latch C is free to swing downwardly under the influence of gravity to the position shown in Figure 3, being limited in the swinging movement by engagement of the tailpiece 30 with the bottom edge of the wall 26 of the housing section 23. In this position, the latch C positively holds the clutch disengaged and the end 31 of the latch bears on the end face of the outer flange 22 of the spool A. When the brakeman releases his hold on the hand grip 34 of the lever B, the hand grip is free to swing to the pendent position shown in Figure 3 while the head 33 of the lever remains in the position shown in said figure. The chain-winding drum is left free to rotate so that the chain will unwind quickly therefrom to immediately release the brakes.

In applying the brakes when the parts of the mechanism are in the position shown in Figure 3, the brakeman rotates the hand wheel in the proper direction to effect rotation of the worm gear 12 in a clockwise direction, as seen in Figure 2, thereby effecting rotation of the shaft 14 and the spool A in the same direction. Inasmuch as the inner end 31 of the latch C is at this time in frictional contact with the outer flange 22 of the spool A, the latch C will be swung upwardly in the manner hereinbefore described and lifted to the position shown in Figure 1 while the clutch head 16 of the shaft 14 will be engaged with the clutch projections 117—117 of the drum 11.

Referring next to the embodiment of the invention illustrated in Figures 4, 5, and 6, the construction thereof differs from that shown in Figures 1, 2, and 3 only in the form of the latch means employed.

In carrying out my invention, as shown in Figures 4, 5, and 6, I employ a latch D cooperating with a spool E fixed to the clutch shaft which is identical with the clutch shaft 14 hereinbefore described and is also indicated by 14. The spool E is of the same design as the spool A hereinbefore described, with the exception that the end flange of the spool E, which is also indicated by 22, is provided with an annular series of spaced lugs 50—50 projecting laterally from said flange.

The latch D comprises a platelike main body portion 51, which is pivotally supported at one end by a pivot pin 52 secured to the housing of the brake mechanism and disposed parallel to the axis of rotation of the shaft 14. At the inner end of the platelike body portion 51, the latch D is provided with an upstanding vertical flange 53 of substantially triangular shape, as most clearly shown in Figure 5. At the bottom of said flange 53, a laterally outstanding lug 54 is provided, which cooperates with the lugs 50—50 of the outer flange 22 of the spool E to effect lifting of the latch D when the spool E is rotated in a clockwise direction, as viewed in Figure 5. The latch D is provided with a second lug 55 above the lug 54 and projecting laterally from the upper portion of the flange 53 of said latch. The lug 55 projects a greater distance than the lug 54 so that the former will rest on the periphery of the outer flange 22 of the spool E when the latch D is in the dotted line position shown by 56 in Figure 5.

In the operation of the mechanism illustrated in Figures 4, 5, and 6, when the operating lever is swung upwardly away from the housing, the clutch shaft 14 will be moved inwardly or to the right, as viewed in Figure 4, thereby disengaging the clutch means from the chain-winding drum of the brakes. The disengaged position of the clutch means is shown in Figure 6. When the parts are in the position shown in Figure 6, the latch D is free to swing downwardly to a position in front of the spool E, thereby holding the clutch means disengaged by preventing movement of the shaft 14 to the left. As hereinbefore pointed out, the lug 55 of the latch D limits the downward movement of the latter so that it will not drop beyond the dotted line position shown in Figure 5. When the driving worm gear is rotated in a direction to tighten the brakes, the clutch shaft 14, together with the spool E, will be rotated in a clockwise direction, as viewed in Figure 5. When thus rotated, the lugs 50—50 of the flange 22 of the spool E will engage the lug 54 of the latch D, thereby lifting the latch to the full line position shown in Figure 5 and unlatching the clutch shaft 14. The clutch shaft is thus free to move to the left from the position shown in Figure 6 to that shown in Figure 4, thereby engaging the clutch means of the shaft with the clutch means of the chain-winding drum. Further rotation of the worm gear then effects rotation of the chain-winding drum and tightening of the brakes through the chain being wound on the drum.

I have herein shown and described what I now consider the preferred manner of carrying out my invention, but the same is merely illustrative and I contemplate all changes and modifications that come within the scope of the claims appended hereto.

I claim:

1. In a clutch mechanism, the combination with a member rotatable in reverse directions; of a rotary driven member; a sliding clutch element rotatable with one of said members, said clutch element and the other member having interengaging clutch means; and a swinging latch member engageable with said clutch element for holding the latter in disengaged position, said latch member being lifted out of latching position by rotation of said clutch element in one direction.

2. In a clutch mechanism, the combination with a member rotatable in reverse directions; of a rotary driven member; a sliding clutch element rotatable with one of said members, said clutch element and the other member having interengaging clutch means; means yieldingly holding said clutch means engaged; and a movable latch member engageable with said clutch element for latching the latter in disengaged position, said latch member being moved out of latching position by rotation of said clutch element in one direction.

3. In a clutch mechanism, the combination with a member rotatable in reverse directions; of a rotary driven member; a sliding clutch element rotatable with one of said members, said clutch element and the other member having interengaging clutch means; and a movable latch member engageable with said clutch element for latching the latter in disengaged position, said latch member and clutch element being in frictional contact when the latch member is in latching position, said latch member being moved out of latching position by rotation of said clutch element in one direction.

4. In a clutch mechanism, the combination with a member rotatable in reverse directions; of a rotary driven member; a sliding clutch element rotatable with one of said members, said clutch element and the other member having interengaging clutch means; a movable latch member engageable with said clutch element for latching the latter in disengaged position; and cooperating means on said latch member and clutch element for moving the latch member out of latching position by rotation of said clutch element in one direction.

5. In a clutch mechanism for hand brakes, the combination with a member rotatable in reverse directions; of a rotary driven member; a sliding clutch element rotatable with one of said members, said clutch element and the other member having interengaging clutch means; and a swingable latch member having an arm engageable with said clutch element for latching the latter in disengaged position, said arm when in latching position having the end thereof in frictional engagement with the clutch element, said arm being swung out of latching position by rotation of said clutch element in one direction.

6. In a clutch mechanism, the combination with a member rotatable in reverse directions; of a rotary driven member; a sliding clutch element rotatable with one of said members, said clutch element and the other member having interengaging clutch means; yielding means holding said clutch element in engaged position; and a pivoted latch member having an arm engageable with the end of said clutch element for latching the latter in disengaged position, said yielding means holding the clutch element in frictional contact with said arm, said arm being swung out of latching position by rotation of said clutch element in one direction.

7. In a clutch mechanism, the combination with a driving member rotatable in reverse directions; of a rotatable driven member coaxial therewith; a clutch element slidable axially of said members, said element being rotatable in unison with one of said members, said element and the other member having interengaging clutch means thereon; means for sliding said clutch element in reverse directions for respectively disengaging and engaging said clutch means; yielding means holds said clutch element in position with the clutch means engaged; and a swinging latch arm pivoted on an axis at right angles to the axis of rotation of said clutch element and engageable with the end of said element at one side of the axis of rotation of said element for holding the latter in disengaged position.

8. In a clutch mechanism, the combination with a driving member rotatable in reverse directions; of a rotatable driven member coaxial therewith; a clutch element slidable axially of said members, said element being rotatable in unison with one of said members, said element and the other member having interengaging clutch means thereon; means for sliding said clutch element in reverse directions for respectively disengaging and engaging said clutch means; yielding means holding said clutch element in position with the clutch means engaged; and a gravity-influenced swinging latch arm pivoted on a horizontal axis at right angles to the axis of rotation of said clutch element and engageable with the end of said element at one side of the axis of rotation of said element for holding the latter in disengaged position, said element by rotation thereof in one direction while engaged with said arm swinging said arm out of latching position.

9. In a clutch mechanism for hand brakes, the combination with a driving member rotatable in reverse directions; of a rotatable driven member coaxial therewith; a reciprocating clutch element coaxial with said members, said clutch element and one of said members being rotatable in unison, said clutch element and the other member having cooperating clutch means thereon, said clutch means being engaged when said element is at one end of the stroke of its reciprocating movement and being disengaged when said element is at the other end of the stroke of its reciprocating movement; yielding means for holding said element at said first named end of the stroke; and a swinging latch arm engageable with the outer end of said element at one side of the axis of rotation of said element for latching the latter in position at the second named end of said stroke, said latch arm being swingable about a horizontal axis at right angles to the axis of rotation of said element and being swung to unlatching position by rotation of said element in one direction.

10. In a clutch mechanism for hand brakes, the combination with a driving member rotatable in reverse directions about a horizontal axis; of a rotary driven member coaxial therewith; a recirprocating clutch element coaxial with said members; said clutch element and one of said members being rotatable in unison, said element and the other member having cooperating clutch means thereon, said clutch means being engaged when said element is at one end of the stroke of its reciprocating movement and being disengaged when said element is at the other end of said stroke; yielding means for holding said element at said first named end of the stroke; and a weighted latch arm pivoted on a horizontal axis for swinging movement toward and away from the free end of said element, said arm being swingable by gravity to a horizontal position with the end of said arm engaged with the end of said element to latch the latter in position at said second named end of the stroke, said arm being swung upwardly by rotation of said element in one direction to unlatching position with respect to said element.

11. In a clutch mechanism for hand brakes, the combination with a driving member rotatable in reverse directions about a horizontal axis; of a rotary driven member coaxial therewith; a reciprocating clutch element coaxial with said members, said clutch element and one of said members being rotatable in unison, said element and the other member having cooperating clutch means thereon, said clutch means being engaged when said element is at one end of the stroke of its reciprocating movement and being disengaged when said element is at the other end of said stroke; yielding means for holding said element at said first named end of the stroke; a weighted latch arm pivoted on a horizontal axis for swinging movement toward and away from the free end of said element, said arm being swingable by gravity to a horizontal position with the end of said arm engaged with the end of said element to latch the latter in position at said second named end of the stroke, said arm being swung upwardlly by rotation of said element in one direction to unlatching position with respect to said element; and stop means arresting movement of said arm when it reaches horizontal position.

12. In a clutch mechanism, the combination with a driving member rotatable in reverse directions; of a rotatable driven member coaxial therewith; a clutch element slidable axially of said members, said element being rotatable in unison with one of said members, said element and the other member having interengaging clutch means thereon; means for sliding said clutch element in reverse directions for respectively disengaging and engaging said clutch means; yielding means holding said clutch element in position with the clutch means engaged; and a gravity-influenced swinging latch arm pivoted on a horizontal axis parallel to the axis of rotation of said clutch element and engageable with the end of said element at one side of the axis of rotation of said element for holding the latter in disengaged position, said element by rotation thereof in one direction while engaged with said arm swinging said arm out of latching position.

13. In a clutch mechanism for hand brakes, the combination with a driving member rotatable in reverse directions; of a rotatable driven member coaxial therewith; a reciprocating clutch element coaxial with said members, said clutch element and one of said members being rotatable in unison, said clutch element and the other member having cooperating clutch means thereon, said clutch means being engaged when said element is at one end of the stroke of its reciprocating movement and being disengaged when said element is at the other end of the stroke of its reciprocating movement; yielding means for holding said element at said first named end of the stroke; and a swinging latch arm engageable with the outer end of said element at one side of the axis of rotation of said element for latching the latter in position at the second named end of said stroke, said latch arm being swingable about a horizontal axis parallel to the axis of rotation of said element and being swung to unlatching position by rotation of said element in one direction.

14. In a clutch mechanism, the combination with a driving member rotatable in reverse directions about a horizontal axis; of a rotary driven member coaxial therewith; a reciprocating clutch element coaxial with said members, said clutch element and one of said members being rotatable in unison, said element and the other member having cooperating clutch means thereon, said clutch means being engaged when said element is at one end of the stroke of its reciprocating movement and being disengaged when said element is at the other end of said stroke; yielding means for holding said element at said first named end of the stroke; and a weighted latch arm pivoted on a horizontal axis parallel to the axis of rotation of said element for swinging movement toward and away from the free end of said element, said arm being swingable by gravity to a horizontal position with the end of said arm engaged with the end of said element to latch the latter in position at said first named end of the stroke, said arm being swung upwardly by rotation of said element in one direction to unlatching position with respect to said element.

15. In a clutch mechanism, the combination with a driving member rotatable in reverse directions about a horizontal axis; of a rotatable driven member coaxial therewith; a reciprocating clutch element coaxial with said members, said clutch element and one of said members being rotatable in unison, said clutch element and the other member having cooperating clutch means thereon, said clutch means being engaged when said element is at one end of the stroke of its reciprocating movement and being disengaged when said element is at the other end of said stroke; yielding means for holding said element at said first named end of the stroke; a weighted latch arm pivoted on a horizontal axis parallel to the axis of rotation of said element for swinging movement toward and away from the free end of said element, said arm being swingable by gravity to a horizontal position with the end of said arm engaged with said end of said element to latch said element in position at said second named end of its stroke, said arm being swung upwardly by rotation of said element in one direction to unlatched position with respect to said element; and stop means arresting movement of said arm when it reaches said horizontal position.

16. In a clutch mechanism for hand brakes, the combination with a driving member rotatable in reverse directions about a horizontal axis; of a rotary driven member coaxial therewith; a reciprocating clutch element coaxial with said members, said clutch element and one of said members being rotatable in unison, said element and the other member having cooperating clutch means thereon, said clutch means being engaged when said element is at one end of the stroke of its reciprocating movement and being disengaged when said element is at the other end of said stroke; yielding means for holding said element at said first named end of the stroke; and a weighted latch arm pivoted on a horizontal axis for swinging movement toward and away from the free end of said element, said arm being swingable by gravity to a horizontal position with the end of said arm engaged with the end of said element to latch the latter in position at said second named end of the stroke, said arm being swung upwardly by rotation of said element in one direction to unlatching position with respect to said element, said arm being held in unlatched position by said latch element when the latter is at the first named end of its stroke and being free to drop to latching position when said element is moved to said second named end of the stroke.

17. In a clutch mechanism, the combination with a rotary driving member; of a rotatable driven member coaxial with said driving member, one of said members having an axial opening therethrough; a clutch shaft slidable in said opening; an integral clutch head at one end of said shaft, said head being of larger diameter than said opening, said clutch head and the other member having interengaging clutch means thereon, said shaft having an axial socket at the other end thereof; a spool having an axial projection fitting said socket of the shaft; a bolt extending through said shaft and spool and clamping said spool to the shaft, said spool having an annular groove therein; and a pivoted lever for reciprocating said shaft, said lever having trunnions engaging within said annular groove of the spool.

18. In a clutch mechanism, the combination with a sliding clutch element; of a lever; means for pivoting said lever to swing on a horizontal axis, said lever having a head and a hand grip portion, said head being connected to said sliding clutch element for shifting the latter; hinge means for pivotally connecting said hand grip to said head; and cooperating stop means on said head and hand grip for preventing upward hinging movement of said hand grip with respect to said head when the lever is swung upwardly to actuate the sliding clutch element.

19. In a clutch mechanism, the combination with a sliding clutch element; of a lever pivoted on a horizontal axis, said lever having a head and a hand grip portion, said head being connected to said clutch element for shifting the latter; hinge eyes on said hand grip and head; a hinge pin extending through said eyes for pivotally connecting the hand grip to the head; and stop means for holding said hand grip and head against relative swinging movement in one direction from aligned position but permitting relative swinging movement thereof in a reverse direction.

ROLAND J. OLANDER.